US008698438B2

(12) United States Patent
Mori

(10) Patent No.: US 8,698,438 B2
(45) Date of Patent: Apr. 15, 2014

(54) MOTOR CONTROL APPARATUS, IMAGE FORMING APPARATUS AND MOTOR CONTROL METHOD

(75) Inventor: Shinya Mori, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/174,626

(22) Filed: Jun. 30, 2011

(65) Prior Publication Data

US 2012/0001579 A1    Jan. 5, 2012

Related U.S. Application Data

(60) Provisional application No. 61/361,339, filed on Jul. 2, 2010.

(51) Int. Cl.
*H02P 1/04* (2006.01)
*G05D 23/00* (2006.01)

(52) U.S. Cl.
USPC ........... 318/473; 318/471; 318/459; 318/685; 318/696; 236/74 R; 236/71; 236/67; 399/43; 399/70; 399/50; 358/1.9; 358/413; 358/412; 358/418

(58) Field of Classification Search
USPC ............ 318/473, 471, 459, 685, 696; 399/43, 399/70, 50, 91, 94, 77, 82, 130, 33, 38, 37, 399/44, 67, 69, 88, 119; 358/1.9, 413, 412, 358/418, 420, 421; 236/74 R, 71, 76
See application file for complete search history.

(56) References Cited

U.S. PATENT DOCUMENTS

| | | | | |
|---|---|---|---|---|
| 4,662,202 A * | 5/1987 | Lambert | ............... | 72/8.5 |
| 6,140,786 A * | 10/2000 | Lee | ............... | 318/471 |
| 6,411,008 B1 * | 6/2002 | Otsubo et al. | ............... | 310/316.01 |
| 7,327,964 B2 * | 2/2008 | Funabiki et al. | ............... | 399/45 |
| 7,630,662 B2 * | 12/2009 | Namiki et al. | ............... | 399/68 |
| 7,635,329 B2 * | 12/2009 | Goldfarb et al. | ............... | 600/37 |
| 7,653,329 B2 * | 1/2010 | Sasai | ............... | 399/127 |
| 7,815,277 B2 * | 10/2010 | Yamada | ............... | 347/17 |
| 7,995,938 B2 * | 8/2011 | Ryu | ............... | 399/44 |
| 8,107,839 B2 * | 1/2012 | Miyaji et al. | ............... | 399/50 |
| 8,112,316 B2 * | 2/2012 | Fei et al. | ............... | 705/26.1 |
| 8,231,211 B2 * | 7/2012 | Okawa | ............... | 347/89 |
| 8,280,266 B2 * | 10/2012 | Ozeki | ............... | 399/43 |
| 2003/0086718 A1 * | 5/2003 | Birumachi | ............... | 399/67 |

FOREIGN PATENT DOCUMENTS

JP    2003-043898    2/2003
JP    2003-092897    3/2003

* cited by examiner

*Primary Examiner* — Rita Leykin
(74) *Attorney, Agent, or Firm* — Patterson & Sheridan, L.L.P.

(57) ABSTRACT

According to one embodiment, a motor control apparatus includes a timer to measure a period in which a job is not executed, a sensor to detect a temperature of a physical object, an acquisition part to acquire time information measured by the timer and temperature information detected by the sensor, and a drive control part that determines a current value of a motor provided in the physical object based on the time information and the temperature information acquired by the acquisition part, and controls the motor current value by applying a voltage level corresponding to the determined current value to a drive element of the motor.

17 Claims, 6 Drawing Sheets

MOTOR DRIVE CURRENT VALUE [mA] 81

| | | NON-OPERATED TIME: t (h) | | |
|---|---|---|---|---|
| | | t≦0.2 | 0.2<t≦1 | 1<t |
| ENVIRONMENT TEMPERATURE Tc (°C) | Tc≦5°C | 500 | 550 | (600) |
| | 5°C<Tc≦10°C | 400 | (450) | 500 |
| | 10°C<Tc | 400 | 400 | 350 |

MOTOR DRIVE CURRENT VALUES DERIVED IN EXAMPLES OF FIGS. 5A AND 5B

SINCE ENVIRONMENT TEMPERATURE Tc1 IS 5°C < Tc1 ≦ 10°C, AND NON-OPERATED TIME IS 0.2[h] < t1 ≦ 1[h], MOTOR DRIVE CURRENT VALUE IS 450mA FROM FIG. 4.

SINCE ENVIRONMENT TEMPERATURE IS Tc(ave) ≦ 5°C, AND NON-OPERATED TIME IS t2 > 1[h], MOTOR DRIVE CURRENT VALUE IS 600mA FROM FIG. 4.

FIG. 6

MOTOR DRIVE CURRENT VALUE Imot [mA]

| ENVIRONMENT TEMPERATURE Tc (°C) | NON-OPERATED TIME: t (h) | | | |
|---|---|---|---|---|
| | 0.2 | 0.5 | 1 | |
| 5 | 510 | 525 | 550 | |
| 7 | 453 | 468 | 493 | |
| 10 | 410 | 425 | 450 | |
| 15 | 344 | 335 | 320 | |
| 30 | 294 | 285 | 270 | |

FUNCTION EXAMPLE:
Imot[mA]=A1/Tc+B1×t+C1 (5°C≦Tc≦10°C)
(A1=1000, B1=50, C1=300)

FUNCTION EXAMPLE:
Imot[mA]=A2/Tc−B2×t+C2 (10°C<Tc≦30°C)
(A2=1500, B2=30, C2=250)

MOTOR CONTROL APPARATUS, IMAGE FORMING APPARATUS AND MOTOR CONTROL METHOD

CROSS-REFERENCE TO RELATED APPLICATIONS

This application is based upon and claims the benefit of priority from: U.S. provisional application 61/361,339, filed on Jul. 2, 2010; the entire contents all of which are incorporated herein by reference.

FIELD

Embodiments described herein relate generally to a technique to control driving of a motor.

BACKGROUND

Hitherto, a current value of a motor as a driving source of a physical object is set on the assumption that the physical object operates at maximum load in view of variation in environment temperature and product variation.

When an apparatus load such as torque is calculated from temperature information, the vicinity of a physical object or surface temperature is measured, and the apparatus load is calculated.

In the former case, even when the environment temperature is high and the load of a drive physical object is not high, electric power supplied to the motor is uniformly consumed, and there is a problem from the viewpoint of energy consumption. In the latter method, the apparatus load is calculated based on the detected temperature information, and the current value corresponding to the apparatus load is set. However, there is a case where a temperature difference between the surface temperature of the drive physical object and the inner temperature is not accurately detected, and there is a problem that the calculated apparatus load is different from an actual value, and a resultant set current is not optimum.

DESCRIPTION OF THE DRAWINGS

FIG. 6 is a view showing an example of a function expression to calculate the motor drive current value from the environment temperature and the non-operated time.

DETAILED DESCRIPTION

In general, according to one embodiment, a motor control apparatus includes a timer to measure a period in which a job is not executed, a sensor to detect a temperature of a physical object, an acquisition part to acquire time information measured by the timer and temperature information detected by the sensor, and a drive control part that determines a current value of a motor provided in the physical object based on the time information and the temperature information acquired by the acquisition part and applies a voltage level corresponding to the determined current value to a motor driver.

Figure 1:
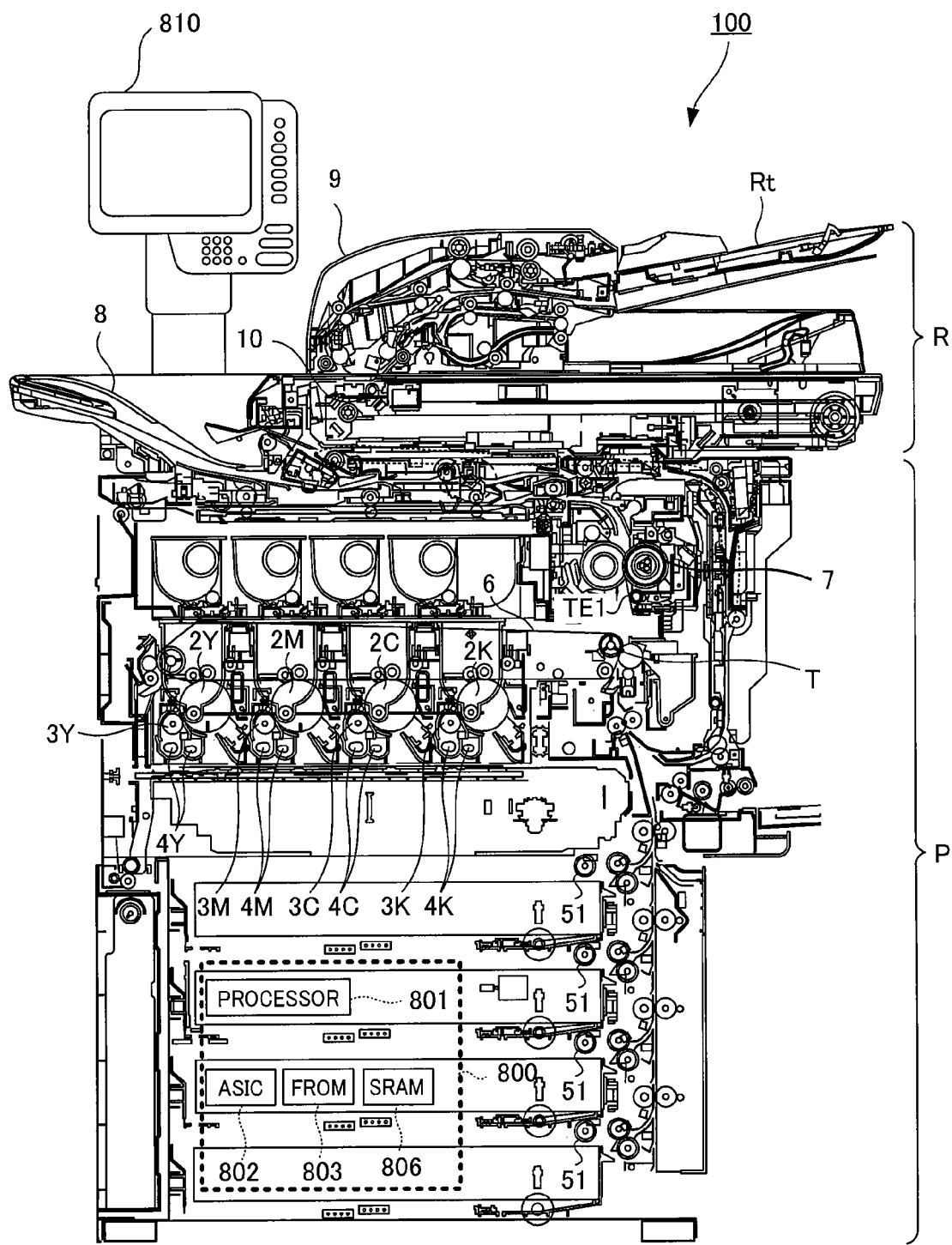
FIG. 1 is a view showing a structural example of an image forming apparatus.

FIG. 1 is a vertical sectional view showing a schematic structure of an image forming apparatus (MFP: Multi Function Peripheral) of an embodiment. As shown in FIG. 1, an image forming apparatus 100 of the embodiment includes a reading part R and an image forming part P.

The reading part R has a function to scan and read an image of a sheet document and a book document. The reading part R includes a scanning optical system 10 including plural reflecting mirrors and an imaging component, and includes an auto document feeder (ADF) 9 capable of automatically feeding a document to a specified placing place. The scanning optical system 10 reads an image of a document automatically fed by the auto document feeder 9 or an image of a document placed on a not-shown document table.

The image forming part P has a function to form a developer image on a sheet based on the image read from the document by the reading part R or image data transmitted from an external equipment to the image forming apparatus 100. Besides, the image forming part P includes photoreceptors 2Y to 2K, developing rollers 3Y to 3K, mixers 4Y to 4K, an intermediate transfer belt 6, a fixing device 7 and a discharge tray 8.

The image forming apparatus 100 includes a control board 800, and the control board 800 includes a processor 801 as an arithmetic processing unit (for example, a CPU (Central Processing Unit) or an MPU (Micro Processing Unit)), an ASIC (Application Specific Integrated Circuit) 802, an FROM (Flash Read Only Memory) 803 as a non-volatile storage device, and an SRAM (Static Random Access Memory) 806 as a volatile storage device. The processor 801 serves to perform various processes in the image forming apparatus 100, and serves to realize various functions by executing programs previously stored in the FROM 803 and by using the SRAM 806 as a work area. The respective storage parts of the FROM 803 and the SRAM 806 can be constructed of a DRAM (Dynamic Random Access Memory), a VRAM (Video RAM), a hard disk drive or the like other than these, and serve to store various information and programs used in the image forming apparatus 100.

Besides, the image forming apparatus 100 includes a control panel 810. The control panel 810 receives instructions from a user and displays processing content to the user.

Hereinafter, the outline of a copying will be described as an example of processes in the image forming apparatus 100 of the embodiment.

First, a sheet picked up by a pickup roller 51 is supplied to a sheet conveyance path. The sheet supplied to the sheet conveyance path is conveyed in a specified conveyance direction by plural roller pairs.

The scanning optical system 10 reads images of plural sheet documents continuously and automatically fed by the auto document feeder 9.

Next, the control board 800 performs a specified image process on image data read from the document by the reading part R. Thereafter, electrostatic latent images of the data after the image process are formed on photoconductive surfaces of the photoreceptors 2Y, 2M, 2C and 2K for transferring developer images of Y (yellow), M (magenta), C (cyan) and K (black) to the sheet.

Subsequently, developers agitated by the mixers 4Y to 4K in developing devices are supplied by the developing rollers (so-called mag rollers) 3Y to 3K to the photoreceptors 2Y to 2K on which the electrostatic latent images are formed as stated above. By this, the electrostatic latent images formed on the photoconductive surfaces of the photoreceptors are visualized.

The developer images formed on the photoreceptors as stated above are transferred onto a belt surface of the intermediate transfer belt 6 (so-called primary transfer), and the developer images conveyed by the rotation of the intermediate transfer belt are transferred onto the conveyed sheet at a specified secondary transfer position T.

The developer images transferred on the sheet are heated and fixed to the sheet by the fixing device 7. The sheet on which the developer images are heated and fixed is conveyed in the conveyance path by plural conveyance roller pairs, and is sequentially discharged onto the discharge tray 8.

In this embodiment, a temperature sensor TE1 is provided in the vicinity of the fixing device 7. The temperature sensor TE1 measures temperature of the fixing device 7 and temperature (hereinafter referred to as environment temperature) of the periphery of the fixing device 7 as needed.

Figure 2:
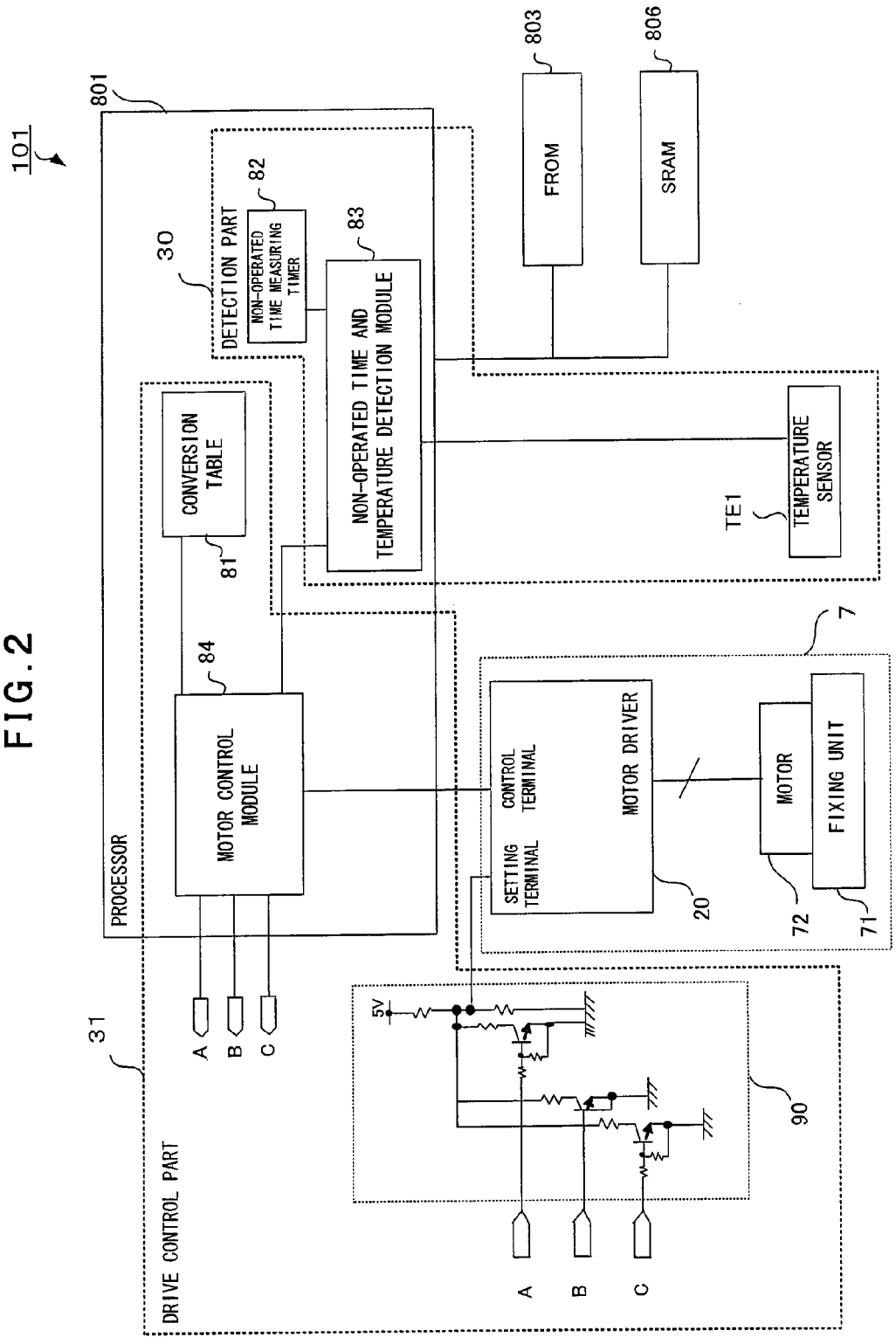
FIG. 2 is a block diagram showing a structural example of a motor control apparatus provided in the image forming apparatus of the embodiment.

Next, a structural example of a motor control apparatus provided in the image forming apparatus 100 will be described with reference to a block diagram of FIG. 2. In this embodiment, a physical object of control is the fixing device 7. As shown in FIG. 2, the fixing device 7 includes a fixing unit 71 including a pair of a heating roller and a pressure roller, a motor 72 as a driving source of the fixing unit 71, and a motor driver 20 as a drive element of the motor 72. In the following description, a method of setting and controlling the current value of the motor 72 will be described. Incidentally, the physical object is not limited to this, and any device may be adopted as long as the device is driven by a motor. The motor 72 is a stepping motor controlled by the motor driver 20, in which a drive current value is changed according to a voltage level, and the motor as the driving source is preferably the stepping motor.

A motor control apparatus 101 includes a detection part 30 and a drive control part 31.

The detection part 30 includes a non-operated time measuring timer 82 (timer), the temperature sensor TE1 (sensor), and a non-operated time and temperature detection module 83 (acquisition part). The non-operated time measuring timer 82 measures a period from the transition of the image forming apparatus 100 into a Ready state to the start of execution of a print job, that is, a period (hereinafter referred to as a non-operated time) in which a job is not executed. In this embodiment, the non-operated time measuring timer 82 corresponds to a hardware clock of the processor 801. Incidentally, the Ready state in this embodiment is the state in which a print job can be executed at any time although the print job is not executed, such as a standby state in which a main power source of the image forming apparatus 100 is turned on and initialization is completed.

The temperature sensor TE1 detects the environment temperature of the fixing device 7. The non-operated time and temperature detection module 83 acquires non-operated time data and environment temperature data from the non-operated time measuring timer 82 and the temperature sensor TE1, and outputs these data to the drive control part 31. In this embodiment, the non-operated time and temperature detection module 83 is implemented by a program, and the processor 801 executes the arithmetic operation.

The drive control part 31 includes a conversion table 81, a motor control module 84 and a voltage level output circuit 90.

The conversion table 81 is a table in which the environment temperature and the non-operated time, and the drive current value of the motor 72 are correlated, and is a table for deriving the drive current value from the environment temperature and the non-operated time. Incidentally, respective data in the conversion table 81 are previously stored in the FROM 803 and are used by the processor 801. The FROM 803 stores plural conversion tables varying according to sheet conveyance speed and each physical object, and one of the plural conversion tables is selected and used according to a previously defined mode (hereinafter referred to as a drive mode). The drive mode can be selected by the user, and can also be changed by the image forming apparatus 100 itself. The drive mode includes various kinds, such as a mode in which toner is fixed to a sheet at high temperature and low speed, and a mode in which printing is performed at high speed.

The motor control module 84 acquires the non-operated time data and the environment temperature data from the non-operated time and temperature detection module 83, and determines a cooling degree of the fixing device 7. That is, the motor control module 84 derives the motor drive current value from the non-operated time data and the environment temperature data based on a correspondence relation stored in the conversion table 81. The motor control module 84 is implemented by a program, and the processor 801 executes the arithmetic operation. The motor control module 84 outputs only one signal of three kinds of signals (signals A to C in this embodiment) or signals of a combination, such as A and B or B and C, to the voltage level output circuit 90 according to the derived motor drive current value. Incidentally, the number of signals or mode of the presence or absence of the combination are not limited to this.

The voltage level output circuit 90 outputs a voltage level corresponding to the signals A to C outputted from the motor control module 84 to a setting terminal of the motor driver 20. As shown in FIG. 2, the voltage level output circuit includes plural resistors. Resistance values of the respective resistors are set so that the voltage level outputted to the motor driver 20 varies according to the respective signals A to C or the combination of the respective signals A to C.

The motor driver 20 acquires a control signal from the motor control module 84, and applies a drive current dependent on the voltage acquired from the setting terminal to the motor 72 while using the control signal as a trigger. Incidentally, although the motor driver 20 is of a type in which the motor drive current can be changed by changing a power source voltage of the set terminal, a mode is not limited and a different type may be used.

The motor control apparatus 101 is mounted on the control board 800 including the FROM 803, the SRAM 806 and the processor 801.

Figure 3:
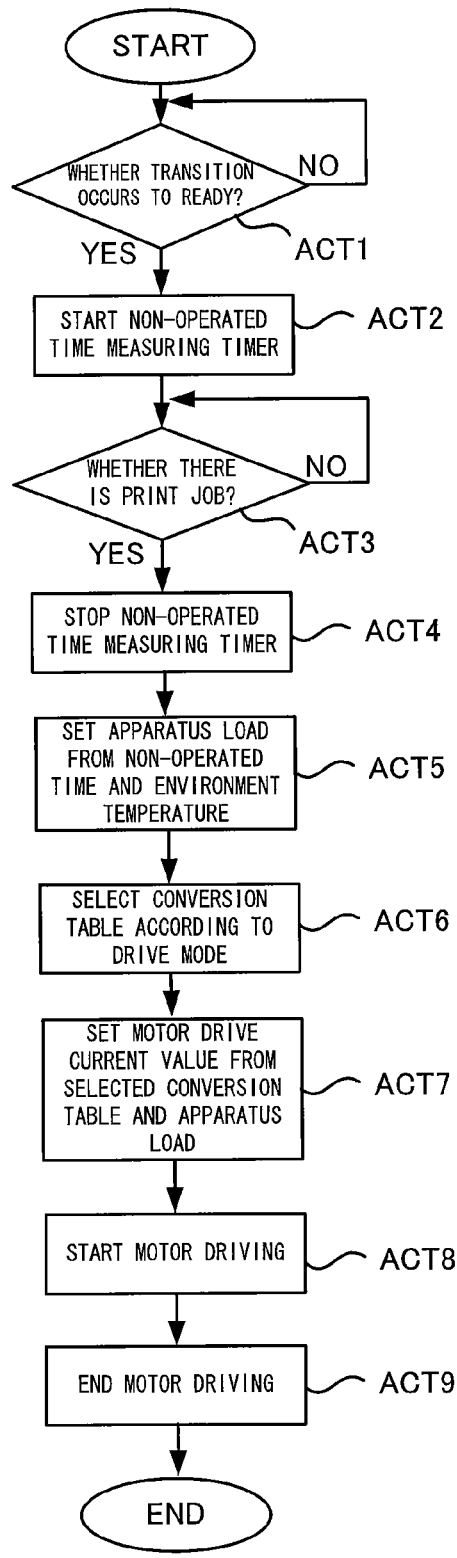
FIG. 3 is a flowchart showing an operation example of the motor control apparatus of the embodiment.

Next, an operation example of the motor control apparatus 101 will be described with reference to a flowchart of FIG. 3.

The processor 801 determines whether the image forming apparatus 100 is placed in a Ready state (ACT 1). Incidentally, respective states (Ready state, Sleep state, job execution state, etc.) of the image forming apparatus 100 are controlled by another not-shown mechanism, and the processor 801 determines the transition of the state. When the Ready state occurs (ACT 1, YES), the non-operated time measuring timer 82 starts to measure a time by the control of the non-operated time and temperature detection module 83 (ACT 2).

Next, the processor 801 determines the presence or absence of a print job (ACT 3). Incidentally, until the print job occurs (ACT 3, loop of NO), temperature measurement by the temperature sensor TE1 is performed at specified intervals as needed, and the non-operated time and temperature detection module 83 acquires data of the environment temperature from the temperature sensor TE1 as needed. When the print job occurs (ACT 3, YES), the non-operated time and temperature detection module 83 stops the non-operated time measuring timer 82 (ACT 4).

The non-operated time and temperature detection module acquires the non-operated time data measured by the non-operated time measuring timer 82, and after the acquisition, the non-operated time and temperature detection module 83 resets the non-operated time measuring timer 82. The non-operated time and temperature detection module 83 regards a set of the acquired non-operated time data and the environment temperature data as an apparatus load and performs setting (temporarily stores the non-operated time data and the environment temperature data in the SRAM 806) (ACT 5). The motor control module 84 selects the conversion table corresponding to the drive mode (ACT 6), and sets the motor drive current based on the selected conversion table and the apparatus load (ACT 7).

Figure 4:
FIG. 4 is a view showing an example of a table for obtaining a motor drive current value from environment temperature and non-operated time.

The details of the operation from ACT 5 to ACT 7 will be described. First, an example of the conversion table 81 used in this embodiment will be described with reference to FIG. 4. The conversion table 81 is divided into three types in which an environment temperature Tc (° C.) is 5° C. or lower, is within a range of higher than 5° C. and not higher than 10° C., and is higher than 10° C. Besides, the conversion table is divided into three types in which a non-operated time t (h) is 0.2 hours or less, is within a range of larger than 0.2 hours and not larger than 1 hour, and is larger than 1 hour. The motor drive current value (mA) is defined for each of these divisions.

Figure 5A:
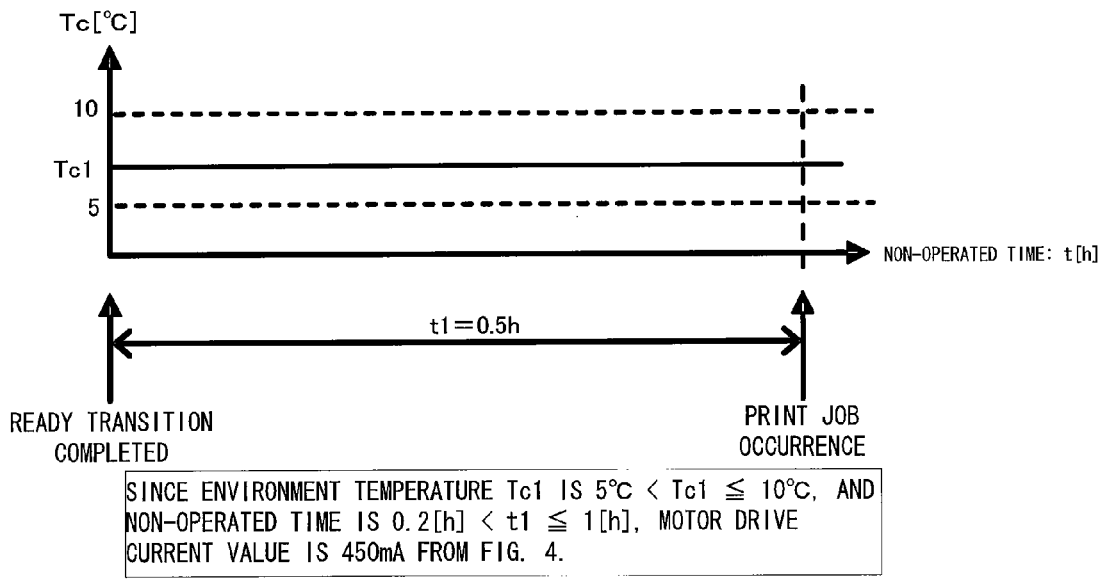
FIG. 5A and FIG. 5B are views each showing a relation example between the non-operated time and the environment temperature.
Figure 5B:
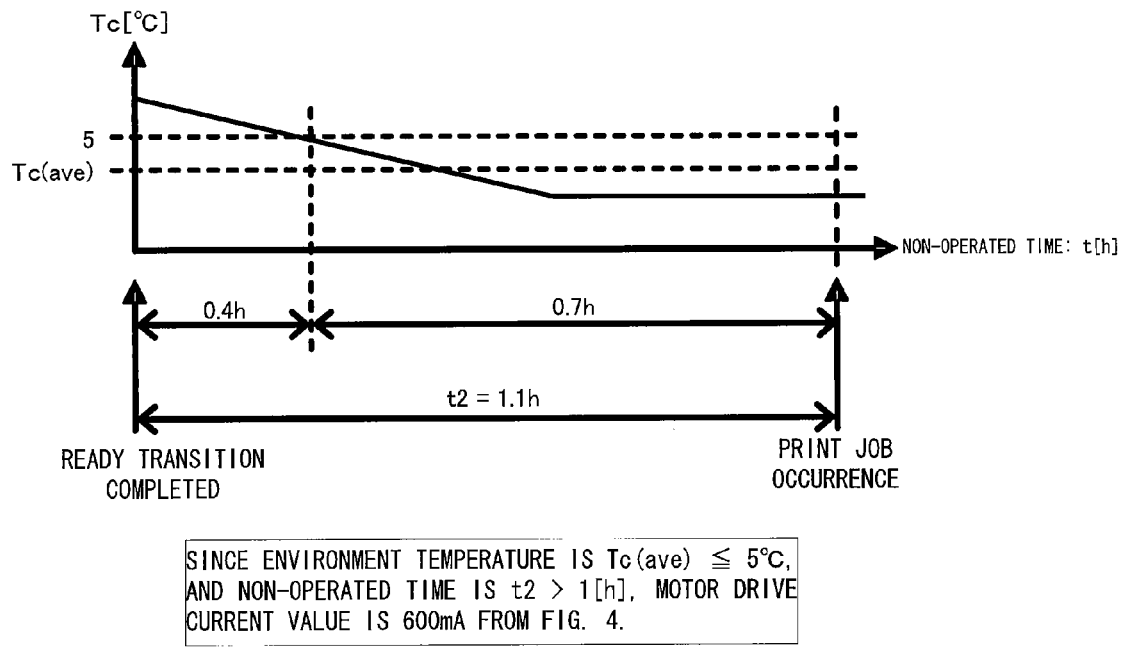

FIG. 5A and FIG. 5B are views each showing a relation example between the non-operated time and the environment temperature. FIG. 5A shows an example of a case where a non-operated time t1 is 0.5 hours, and an environment temperature Tc1 is always 7.5° C. In this case, the non-operated time and temperature detection module 83 outputs the non-operated time data of 0.5 and the environment temperature data of 7.5 to the motor control module 84. The motor control module 84 refers to the conversion table 81, and derives a motor drive current value of 450 mA from the acquired values of the non-operated time data and the environment temperature data.

FIG. 5B is a view showing an example in which the temperature is lowered to a constant value. In the example of FIG. 5B, the environment temperature is 5° C. or higher until the non-operated time becomes 0.4 hours, and also after that, the environment temperature is lowered to the constant value. FIG. 5B shows an example in which the print job occurs after 0.7 hours from a time when the temperature becomes lower than 5° C. In the case of this example, the non-operated time and temperature detection module 83 calculates an average value Tc (ave) from the environment temperature acquired as needed in a non-operated time t2 (1.1 hours in total), and outputs the average value Tc (ave) to the motor control module 84. Since the average value Tc (ave) is 5° C. or lower and the non-operated time t2 is longer than 1 hour, the motor control module 84 refers to the conversion table 81, and derives a motor drive current value of 600 mA.

As described above, the conversion table is defined for each drive mode, and the motor control module 84 selects the conversion table to be referred for each drive mode (ACT 6), and uses the selected conversion table to set the motor drive current (ACT 7).

Next, an operation example of the motor control apparatus 101 will be described. The motor control module 84 outputs a signal corresponding to the derived motor drive current, that is, one of the signals A to C or a combination of the signals A to C to the voltage level output circuit 90. Besides, the motor control module 84 outputs a control start signal to the motor driver 20.

The voltage level output circuit 90 outputs a voltage level corresponding to an inputted signal of the signals A to C to the motor driver 20. The motor driver 20 drives the motor 72 at a current value determined by this voltage level, and the fixing unit 71 operates (ACT 8). Besides, when the print job is completed, the motor 72 stops (ACT 9), and the state of the image forming apparatus 100 transitions from the print job execution state to the Ready state (returns to ACT 1 when necessary).

Other than the above, an implementation can be made to calculate the motor drive current value by using a function expression of the environment temperature and the non-operated time. This implementation example will be described with reference to FIG. 6. In this example, the function expression to be used is changed according to the value of the environment temperature. When the environment temperature Tc is from 5° C. to 10° C., the motor control module 84 calculates by using an expression of $$Imot=A1/Tc+B1 \times t+C1,$$

and when the environment temperature Tc is from 10° C. to 30° C., the motor control module calculates by using an expression of $$Imot=A2/Tc-B2 \times t+C2.$$

Here, Imot denotes a motor drive current value (mA), t denotes a non-operated time (h), and A1, A2, B1, B2, C1 and C2 are constant values (see FIG. 6 with respect to specific values of the constants). In the case of this implementation, the constant values of A1 to C2 and the function expressions are stored in the FROM 803, and the motor control module 84 changes the function expression and the constants according to the environment temperature Tc and acquires them from the FROM 803. Besides, the implementation may be such that plural function expressions and constants are stored in the FROM 803 for respective drive modes, and the function expressions and the constants are changed according to the drive mode. Incidentally, the function expressions and the constants illustrated in FIG. 6 are merely an example, and no limitation is made to these.

In this embodiment, although the description is made on the example in which the temperature sensor is used, another sensor such as a temperature and humidity sensor may be used. Besides, in this embodiment, although the description is made on the implementation example in which the temperature sensor is arranged in the vicinity of the physical object and measures the peripheral temperature, the temperature sensor may be arranged on a surface or the inside of the physical object, and may measure the surface temperature or the inside temperature.

Besides, the non-operated time and temperature detection module 83 acquires the temperature information at constant intervals from the temperature sensor TE1, calculates the average value of the temperature information acquired in the non-operated time, and delivers the average value to the motor control module 84. However, the mode is not limited. Temperature data acquired at a specified timing, such as temperature at the start of the non-operated time or temperature at the end, may be delivered as it is to the motor control module 84.

In this embodiment, although the description is made on the assumption that the reference point of the start of the non-operated time measuring timer is the time when the Ready state occurs, another reference may be used. For example, the reference point of the start may be the time when the Sleep state occurs, or the time when the power source of the image forming apparatus 100 is turned on and the initialization is completed. Besides, in the embodiment, the base point of the non-operated time can be changed according to the drive mode to the start time of the Ready state, the start time of the Sleep state, or the state after power-on and initialization. In this case, the motor control module 84 determines whether measurement of the non-operated time is started when a transition is made to one of the states according to the drive mode.

Besides, another calculation reference may be used for the calculation of the environment temperature, the non-operated time and the motor drive current.

The data control device of this embodiment has the function to grasp the cooling degree of the physical object based on the environment temperature of the physical object and the non-operated time as the condition of the drive current value setting of the motor such as the stepping motor, in addition to the mode condition such as the sheet conveyance speed, and to calculate and set the motor current value required to drive the motor. By this, the drive motor current value can be suppressed not to supply an excessive torque, and the image forming apparatus in which excessive power is not consumed can be provided.

As described above in detail, according to the technique disclosed in this specification, the control of reducing the power consumption can be performed for the motor.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A motor control apparatus comprising:
a timer configured to measure a period in which a job is not executed;
a sensor configured to detect a temperature of a physical object;
an acquisition processor configured to acquire the period measured by the timer and the temperatures detected by the sensor, and to calculate an average temperature of the acquired temperatures in the period; and
a drive control processor configured to determine a current value for a motor provided in the physical object based on the period and the average temperature calculated by the acquisition processor, and to control the motor by applying a voltage level corresponding to the determined current value to a drive element of the motor.

2. The apparatus of claim 1, wherein
the drive control processor determines the current value for the motor by referring to a conversion table which is previously stored in a storage device and in which average temperatures, periods, and the current values are correlated.

3. The apparatus of claim 1, wherein
the drive control processor determines the current value for the motor by using an expression for calculating the current value from the average temperature and the period.

4. The apparatus of claim 1, wherein
the drive control processor determines the current value for the motor according to a previously defined mode.

5. The apparatus of claim 4, wherein
the motor control apparatus is provided in an image forming apparatus,
a start of the period in which the job is not executed is one of a time when the image forming apparatus transitions to a Ready state in which a print job is not executed and the print job can be executed at any time, a time when the image forming apparatus transitions to a Sleep state, and a time in which a power source of the image forming apparatus is turned on and the image forming apparatus is initialized, and
the drive control processor determines, according to the previously defined mode, that one of the times is the start of the period.

6. The apparatus of claim 1, wherein
the motor provided in the physical object is a stepping motor.

7. The apparatus of claim 1, wherein
the motor control apparatus is provided in an image forming apparatus, and the physical object is a fixing device provided in the image forming apparatus.

8. An image forming apparatus comprising:
a timer configured to measure a period in which the image forming apparatus does not execute a print job;
a sensor configured to detect a temperature of a physical object provided in the image forming apparatus;
an acquisition processor configured to acquire the period measured by the timer and the temperatures detected by the sensor, and to calculate an average temperature of the acquired temperatures in the period; and
a drive control processor configured to determine a current value for a motor provided in the physical object based on the period and the average temperature calculated by the acquisition processor, and to control the motor by applying a voltage level corresponding to the determined current value to a drive element of the motor.

9. The apparatus of claim 8, wherein
the drive control processor determines the current value for the motor by referring to a conversion table which is previously stored in a storage device and in which average temperatures, periods, and current values are correlated.

10. The apparatus of claim 8, wherein
the drive control processor determines the current value for the motor by using an expression for calculating the current value from the average temperature and the period.

11. The apparatus of claim 8, wherein
the drive control processor determines the current value for the motor according to a previously defined mode.

12. The apparatus of claim 11, wherein
a start of the period in which the job is not executed is one of a time when the image forming apparatus transitions to a Ready state in which a print job is not executed and the print job can be executed at any time, a time when the image forming apparatus transitions to a Sleep state, and a time in which a power source of the image forming apparatus is turned on and the image forming apparatus is initialized, and
the drive control processor determines, according to the previously defined mode, that one of the times is the start of the period.

13. The apparatus of claim 8, wherein
the motor provided in the physical object is a stepping motor.

14. The apparatus of claim 8, wherein
the physical object is a fixing device provided in the image forming apparatus.

15. A motor control method comprising:
measuring, with a timer provided in a motor control apparatus, a period in which a job is not executed;
detecting a temperature of a physical object with a sensor provided in the motor control apparatus;
acquiring the period measured by the timer and the temperatures detected by the sensor;
calculating an average temperature of the acquired temperatures in the period;
determining a current value for a motor provided in the physical object based on the acquired period and the calculated average temperature; and
controlling the motor by applying a voltage level corresponding to the determined current value to a drive element of the motor.

16. The method of claim 15, wherein
determining the current value includes referring to a conversion table which is previously stored in a storage device and in which average temperatures, periods, and current values are correlated.

17. The method of claim 15, wherein
determining the current value includes using an expression for calculating the current value from the average temperature and the period.

* * * * *